United States Patent [19]

Hirzy

[11] 4,212,957

[45] Jul. 15, 1980

[54] PLASTIFIERS, METHOD OF PREPARATION AND PVC COMPOSITIONS CONTAINING SAME

[75] Inventor: John W. Hirzy, Kirkwood, Mo.

[73] Assignee: Monsanto Company, St. Louis, Mo.

[21] Appl. No.: 864,553

[22] Filed: Dec. 27, 1977

[51] Int. Cl.² .................. C08L 27/00; C08L 75/06
[52] U.S. Cl. ............................... 525/131; 525/127; 525/440
[58] Field of Search ............ 260/860, 859 R, 859 PV; 528/273; 525/440, 123, 127, 131

[56] References Cited

U.S. PATENT DOCUMENTS 3,637,553  1/1972  Keberle et al. ............ 260/859 PV

Primary Examiner—J. Ziegler
Attorney, Agent, or Firm—George R. Beck

[57] ABSTRACT

Block copolyesters and block copolyesterurethanes are presented which are useful as plastifiers for PVC. The plastifiers, depending on process variations, contain ordered or random blocks of amorphous and semi-crystalline structure and are characterized as being highly compatible and substantially non-fugitive when blended with PVC.

15 Claims, No Drawings

PLASTIFIERS, METHOD OF PREPARATION AND PVC COMPOSITIONS CONTAINING SAME

BACKGROUND OF THE INVENTION

A plasticizer is a material incorporated in a plastic to increase the workability, flexibility or distensibility (elongation) of the plastic. Plasticization on the molecular level, according to theory, is the weakening or rupturing of selective "bonds" while leaving others strong to make possible the shaping, flexing or molding of the material being plasticized.

Although natural plasticizers, e.g., water, camphor, oils, pitch, etc., have been used since the earliest days of recorded history, it has only been since the early 1900's that synthetic materials have been used to plasticize resins and polymers. Since the advent of polyvinyl chloride (PVC), the most generally used synthetic plasticizers have been the esters of phthalic and phosphorus acids, e.g., dioctyl phthalate, diphenyl phthalate, tricresyl phthalate, triphenyl phosphate and the like. Monomeric plasticizers, while admirably fulfilling their function of external plasticization of PVC, have lately come under increasing pressure from environmentalists since they are known to "bloom", i.e., exude to the surface of a plasticized polymer and migrate to other materials in contact therewith. Despite the regulatory status and long safe history of plasticizer usage, the migration of phthalates and other plasticizers to medical and food products has caused considerable concern and incentive to search for truly permanent external plasticizer systems.

Because of the shortcomings of conventional monomeric plasticizers, e.g., volatility, extractability and migration, a considerable amount of research has been conducted in an effort to develop a truly permanent, high molecular weight polymeric modifier for PVC which is nonfugitive. The term "plastifier" has been coined to describe such modifiers to distinguish them from the conventional liquid to semi-solid type external plasticizers, usually monomeric, heretofore used as modifiers for PVC. The need is obvious for a plastifier which would have the properties of high permanence in the plastified system and good efficiency combined with a low order of toxicity and environmental safety.

SUMMARY OF THE INVENTION

It has now been found that copolyesters and copolyesterurethanes, having a particular structural sequence of amorphous and semi-crystalline blocks and which are of a high molecular weight, may be used as plastifiers for PVC. Such plastifiers afford a high degree of permanence with good efficiency, low toxicity and environmental stability. As will be further described hereinafter, the plastifiers of this invention may be prepared in random or ordered fashion to afford block copolyesters and block copolyesterurethanes useful as plastifiers for PVC.

PRIOR ART

Following is a description of the most pertinent prior art known to applicant:

U.S. Pat. No. 2,691,006 describes linear ordered crystalline copolyesters containing a plurality of polyester sequences, at least two of which have an average sequence length of at least two ester units. The copolyesters are prepared by coupling separately prepared different polyesters. Thus, a hydroxy-terminated polyester and an acid chloride-terminated polyester are condensed or two separately prepared polyesters having both hydroxy and carboxyl end groups may be coupled with a diisocyanate or other coupling agent. In the preparation of the polyesters, which may be coupled or condensed with each other, there are used aromatic or aliphatic dicarboxylic acids and glycols. There is no concept disclosed which describes the combining of amorphous and crystalline polyesters to obtain a high molecular weight copolyester having particular sequences of amorphous and crystalline structure.

U.S. Pat. No. 3,446,778 describes the preparation of composite copolymers characterized by a crystallizable predominantly aromatic polyester block and an amorphous rubbery block. The crystalline and amorphous blocks are joined via a coupling agent. There is no concept of sequentially coupling a polyester prepared from a diacid and a non-crystallizing glycol with a polyester prepared from a diacid and a mixture of crystallizing and non-crystallizing glycols.

PREFERRED EMBODIMENTS OF THE INVENTION

In general, the plastifiers of the present invention are prepared by coupling amorphous and semi-crystalline hydroxy-terminated polyester prepolymers and extending the coupled prepolymers into a high molecular weight block copolymer. The resultant block copolymer is a block copolyester or block copolyesterurethane depending upon the agent used to effect coupling of the prepolymer molecules. Thus, if the coupling agent is an acid halide, e.g., adipoyl chloride, the resultant high polymer will be a copolyester. If the coupling agent contributes urethane linkages, the resultant high polymer will be a block copolyesterurethane.

By controlling the sequence of the addition of the reactants, a variety of block copolymers, each having its own unique characteristics, may be obtained. The main varieties of block copolymers which are obtained in accordance with this invention may be illustrated by three varieties of block copolymers which have been arbitrarily designated as (A) ordered, (B) ordered-random and (C) macrorandom. These main varieties of block copolymers are representationally described below.

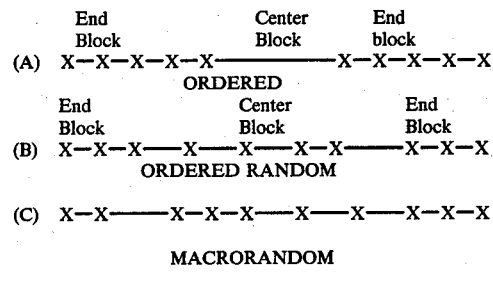

In the above representations, the straight lines represent semi-crystalline blocks and the —X—X— lines represent amorphous blocks. In the structure of the macrorandom copolymer, one or more end groups may be semi-crystalline or amorphous. The dots represent ester or urethane links between molecules. In general, the copolymers of the invention are comprised of amorphous end blocks constituting from about 15 to about 50 percent by weight of the copolymer, based on the total copolymer, and a center block constituting, correspondingly, from about 85 to about 50 percent of the copolymer.

The unique efficacy of block copolymers (A), (B) and (C) as PVC plastifiers is clearly demonstrated by comparison between them and an isomeric polymer of the same molecular weight which contains no semi-crystalline/amorphous block units. Such a non-block copolymer is referred to hereinafter as "microrandom" copolymer and data is presented to show its non-utility as a PVC plastifier.

The polyester prepolymers which are used to prepare the high molecular weight plastifiers of the present invention are prepared by the reaction of aliphatic or aromatic dicarboxylic acids with aliphatic or aromatic dihydroxy compounds.

Exemplary dicarboxylic acids which are utilized in the process of preparing the prepolymers of the present invention are aliphatic and aromatic dicarboxylic acids having from about 4 to about 10 carbon atoms, e.g. succinic, glutaric, adipic, pimelic, suberic, azelaic, sebacic, phthalic and the like.

The dihydroxy compounds which are utilized in the preparation of the prepolymers used in the present invention are crystallizing and non-crystallizing dihydroxy compounds. The crystallizing compounds are exemplified by ethylene glycol, 1,4-butylene glycol, 1,6-hexanediol, neopentyl glycol and the like. The non-crystallizing compounds are exemplified by 1,3-butylene glycol, 1,2-propylene glycol, 1,3-propylene glycol, 2-ethyl-1,3-hexanediol, diethylene glycol, dipropylene glycol and the like.

The agents which are used to couple the prepolymers determine whether the polymer is a copolyester or a copolyesterurethane. Such agents are acid halides and isocyanates.

Acid halides which are used as coupling agents in accordance with the present invention include adipoyl chloride, oxalyl chloride, the phthaloyl chlorides, phosgene and the like.

Isocyanates which act as coupling agents in accordance with the present invention include hexamethylene diisocyanate, methylene bis-(p-phenyl isocyanate), toluene diisocyanate, p-phenylene diisocyanate and the like.

In the preparation of the polyester prepolymers, amorphous prepolymers are prepared by reacting a dicarboxylic acid as stated above, e.g., adipic acid, with a non-crystallizing dihydroxy compound, e.g., adipic acid, with a non-crystallizing dihydroxy compound, e.g., 1,3-butylene glycol. The semi-crystalline prepolymers are prepared by reacting a dicarboxylic acid, e.g., adipic acid, and a mixture of dihydroxy compounds, one of which is non-crystallizing, e.g., 1,3-butylene glycol, and one of which is a crystallizing dihydroxy compound, e.g., 1,4-butylene glycol in a ratio of from about 0.1 to about 0.5, non-crystallizing to crystallizing dihydroxy compound.

As stated above, the preferred embodiments of block copolymers prepared in accordance with this invention are the ordered copolymer, the ordered-random copolymer and the macrorandom copolymer.

The ordered block copolymer is prepared by initially making crystalline or semi-crystalline prepolymers and then coupling the prepolymers via ester or urethane links. Upon attainment of the crystalline or semi-crystalline polymer of the desired molecular weight, separately prepared amorphous prepolymer and coupling agent are reacted with the crystalline or semi-crystalline polymer chain. In such manner, the copolymer comprises a center block which may be crystalline or semi-crystalline and having amorphous end blocks. Accordingly, the ordered copolymer has from about 20 to about 95 percent crystallinity, based on heat of fusion, as set forth below. The center block of the ordered copolymer may, however, be from 20 to about 100 percent crystalline depending on whether the prepolymer used in its preparation is semi-crystalline or crystalline. Preferably, the copolymer has a crystallinity of from about 20 to about 50 percent based on heat of fusion. Especially preferred is a copolymer having about 30 percent crystallinity. The ordered block copolymer has a molecular weight of about 85 to about 100,000 and has excellent compatibility with PVC.

The ordered-random copolymer is prepared by separately making amorphous and semi-crystalline prepolymers and then coupling them via ester or urethane links to form a block copolymer having randomly alternating semi-crystalline and amorphous blocks. Additional amorphous prepolymer and coupling agent are then added so that the randomly alternating semi-crystalline and amorphous block copolymer is capped with amorphous end groups. Accordingly, the ordered-random copolymer has from about 25 to about 95 percent crystallinity based on heat of fusion. The center, semi-crystalline block may have from about 20 to about 95 percent crystallinity, preferably from about 20 to about 50 percent crystallinity. Preferably the copolymer has a crystallinity of from about 20 to about 50 percent based on heat of fusion. Especially preferred is a copolymer having about 25 percent crystallinity. The ordered-random block copolymer has a molecular weight of from about 80,000 to about 100,000 and has excellent compatibility with PVC. The macrorandom copolymer contains randomly alternating amorphous and semi-crystalline blocks. Thus, it is prepared by separately preparing amorphous and semi-crystalline prepolymers of the desired molecular weight and then combining the prepolymers with a coupling agent and allowing random coupling to occur. The macrorandom copolymer has from about 20 to about 95 percent crystallinity, based on heat of fusion. Preferably, it has a crystallinity of from about 20 to about 40 percent crystallinity. Especially preferred is a copolymer having about 30 percent crystallinity. The macrorandom copolymer has a molecular weight of from about 85,000 to about 100,000 and has excellent compatibility with PVC.

The isomeric microrandom copolymer is so-named because the amorphous and crystalline regions alternate on a molecular level rather than on a prepolymer level. Thus, it is prepared by reacting equivalent amounts of the dicarboxylic acid, non-crystallizing dihydroxy compound and crystallizing dihydroxy compound to provide a prepolymer containing randomly alternating molecules of crystallizing and non-crystallizing dihydroxy compound reacted with the dicarboxylic acid. This prepolymer is then reacted with a coupling agent to produce a high polymer. The characteristics of the isomeric microrandom copolymer are a molecular weight of about 100,000 and poor compatibility with PVC.

The degree of crystallinity in the semi-crystalline prepolymers is determined by regulating the ratio of non-crystallizing dihydroxy compound to crystallizing dihydroxy compound and by delaying the addition of the non-crystallizing dihydroxy compound. The degree of crystallinity in the block copolymers is governed by the ratio of the weights of crystalline or semi-crystalline and amorphous prepolymers used in the coupling reaction. Generally, the copolymers of the invention have from about 20 to about 95 percent crystallinity, as defined below.

A preferred copolyester or copolyesterurethane is the ordered-random type having a crystallinity of approximately thirty percent, based on a comparison of the heat of fusion of the copolymer under consideration with the heat of fusion of poly(1,4-tetramethylene adipate) which is one hundred percent crystalline. The end blocks comprise about twenty percent of the copolyester or copolyesterurethane and the center block comprises about eighty percent of the copolyester or copolyesterurethane and may contain about twenty percent amorphous segments by weight.

Regulation of the crystallinity is important when these copolymers are to be blended with another polymer, such as PVC. If crystallinity is too high, these copolymers will separate from the other polymer at the surface, yielding an unsightly "bloom". If crystallinity is too low, as in the case of the microrandom copolymer, these copolymers take the form of tacky glasses, i.e. highly viscous liquids which are difficult to handle, and which do not blend easily with other polymers, such as PVC.

Likewise, location of semi-crystalline segments is important, especially when these copolymers are to be blended with another polymer. If the semi-crystalline segments are at chain ends, these segments find it easier to migrate to the surface and separate from the blend in the form of a solid "bloom".

In block copolymers prepared by coupling prepolymers, the prepolymers ordinarily have a molecular weight (number average) of from about 1,000 to about 10,000, preferably from about 2,000 to about 6,000.

The extended block copolymer (i.e., high polymer) ordinarily has a molecular weight of from about 50,000 to about 400,000, preferably from about 100,000 to about 200,000.

In preparing the polyester prepolymers, the ratio of dihydroxy compound to dicarboxylic acid is generally from about 1.05 to about 1.50, preferably from about 1.10 to about 1.30.

In preparing the high polymer, the ratio of prepolymer to coupling agent is from about 10 to about 30, preferably from about 14 to about 18.

The following Examples are included herein by way of illustration and not by way of limitation.

EXAMPLE 1

This example illustrates the preparation of an ordered block copolyesterurethane and an ordered block copolyester. The preparations differ only in the coupling agent used.

(A) Preparation of Amorphous Prepolymer

To a stainless steel reactor, equipped with a heat source, an agitator, a refluxing fractionating column, condenser and vacuum system, there were charged 0.47 mole adipic acid, 0.61 mole 1,3-butylene glycol and 0.0003 mole titanium tetrachloride. Prior to charging the reactants, the reactor was filled with nitrogen. The reaction mixture was heated rapidly to reflux and the reflux return to the fractionating column head was adjusted to maintain reflux temperature of about 100° C. while removing water of esterification. The reaction mass was then heated to approximately 200° C. and vacuum was applied to achieve distillation of excess glycol. The batch was held at approximately 200° C. for one hour and then cooled to room temperature. Xylene was added to the reaction mixture and the xylene solution was filtered and dried. The amorphous block prepolymer was characterized by gel permeation chromatography, showing molecular weight of approximately 3,000, by hydroxyl content of approximately 0.36%, and by acidity level of approximately 0.2 meq/100 g. The percent solids was 38%.

(B) Preparation of Semi-Crystalline Prepolymer

To the reactor described above, additionally equipped to allow charging of 1,4-butylene glycol under vacuum, there were charged 0.48 mole adipic acid, 0.12 mole 1,3-butylene glycol and 0.38 mole 1,4-butylene glycol and 0.0003 mole titanium tetrachloride. A nitrogen atmosphere was maintained as described above. The batch was heated to approximately 200° C. while removing water of esterification. After partial evacuation of the system, there was added 0.01 mole 1,4-butylene glycol, the batch was heated to 215° C. and slow evacuation of the system was resumed. After excess glycol had distilled, the batch was cooled, vented to the atmosphere and dissolved in xylene. The warm batch was filtered and dried. The semi-crystalline block prepolymer was characterized by gel permeation chromatography, showing molecular weight of approximately 5,000, by hydroxyl content of approximately 0.54%, and by acidity level of approximately 0.2 meq/100 g. The percent solids was 38%. The percent crystallinity was 47%.

(C) Preparation of an Ordered Block Copolyesterurethane

To a stainless steel reactor equipped with a heat source, an agitator and auxiliary charge tanks, there were charged 182 parts of semi-crystalline prepolymer solution described above and 25 parts of xylene. The solution was heated to 140° C. and 7.8 parts of hexamethylene diisocyanate in five approximately equal portions were added over a period of about 2 hours. Then, 98 parts of the amorphous prepolymer solution described above plus 120 parts of xylene were added. Next there were added 2.8 parts of hexamethylene diisocyanate in three approximately equal portions over a period of 1 hour. The reaction mixture was stirred at 140° C. for an additional hour, then 1 part absolute ethanol was added after cooling the mixture to 80° C. The polymer was isolated by adding the reaction mass to a large excess of cold methanol. The yield was 101 parts of polymer with a molecular weight of about 90,000. The 1,3-/1,4-butylene unit ratio was 0.46±0.01.

The corresponding copolyester was prepared in an analogous fashion, using adipoyl chloride/pyridine as the coupling agent.

EXAMPLE 2

This Example illustrates the preparation of an ordered-random block copolyesterurethane.

Steps (A) and (B) of Example 1 were repeated. Preparation of high polymer was as follows:

(C) High Polymer

To a suitable vessel equipped with an agitator, heat source, reflux condenser and water trap, there were charged 165 parts of semi-crystalline prepolymer solution and 41 parts amorphous prepolymer solution. The batch was heated to reflux and water was removed. To the batch was added approximately 2.5 parts of hexamethylene diisocyanate and the entire mixture was heated to reflux until maximum viscosity was reached.

At that point, 53 parts of amorphous block prepolymer solution and 0.9 parts hexamethylene diisocyanate was added and heating was continued until, again, maximum viscosity was reached. The batch was cooled to 75° C., dry ethanol was added and the copolyesterurethane was precipitated. The yield was 93 parts of polymer with a molecular weight of about 85,000, and a 1,3-/1,4-butylene unit ratio of 0.46±0.01.

EXAMPLE 3

This Example illustrates the preparation of a macrorandom block copolyesterurethane and a macrorandom block copolyester.

To a stainless steel reactor described above, there were charged 168 parts of the semi-crystalline prepolymer solution described above and 97 parts of the amorphous prepolymer solution described above. Xylene (100 parts) was added and the solution was heated to 140° C. Over a period of 4 hours 10.4 parts of hexamethylene diisocyanate was added in six approximately equal portions. The reaction mass was stirred at 140° C. for 2 hours, then cooled to 80° C. and 1 part of absolute ethanol was added. The polymer was isolated as described above and there was obtained 105 parts of high polymer of molecular weight of about 95,000, and a 1,3-/1,4-butylene unit ratio of 0.46±0.01.

The corresponding copolyester was prepared in an analogous fashion using adipoyl chloride/pyridine as the coupling agent.

EXAMPLE 4

This Example illustrates the preparation of the isomeric microrandom block copolyesterurethane and microrandom block copolyester.

(A) Preparation of Microrandom Prepolymer

To a nitrogen purged stainless steel reactor, equipped with a heat source, an agitator, a refluxing fractionating column, condenser and vacuum system there were charged 3.00 moles adipic acid, 2.22 moles 1,3-butylene glycol, 1.67 moles 1,4-butylene glycol and 0.002 mole titanium tetrachloride. The reaction mixture was heated to reflux temperature and the reflux return was adjusted to maintain reflux temperature of about 100° C. while removing water of esterification. The reaction mass was heated to about 200° C. and vacuum was applied to remove excess glycol. The batch was held at terminal conditions for about one hour then cooled to 120° C. and sufficient xylene was added to make a 38% solids solution.

The prepolymer had a molecular weight of about 4,000, a hydroxyl content of about 0.40% and an acidity of about 0.2 meq/100 g. Its 1,3-/1,4-butylene unit ratio was 0.46±0.01.

(B) Preparation of Microrandom Copolyesterurethane

To a stainless steel reactor as described in Example 2 there were charged 500 parts of the solution of microrandom prepolymer described above. The reaction mass was heated to about 140° C. and 10.3 parts of hexamethylene diisocyanate were added in three approximately equal portions over a 1 hour period. Then 80 parts of the prepolymer solution were added over a 4 hour period. After about an hour, 1 part of absolute ethanol was added.

The polymer was isolated by pouring the reaction mass into methanol and decanting the supernatant liquid. The polymer had a molecular weight of about 80,000 and a 1,3-/1,4-butylene unit ratio of 0.46±0.01.

In like fashion the microrandom copolyester was made using adipoyl chloride/pyridine as coupling agent.

The following Example illustrates the utility of the block copolyesterurethanes and block copolyesters as plastifiers for polyvinyl chloride.

EXAMPLE 5

Polyesterurethanes of the ordered, ordered-random, macrorandom and microrandom types were prepared in accordance with Examples 1, 2, 3 and 4, respectively. The ordered plastifier was a solid and was 29% crystalline. The ordered-random plastifier was a solid and was 27% crystalline. The macrorandom plastifier was a solid and was 32% crystalline. The microrandom polyesterurethane was a glass and was less than 10% crystalline.

Using standard technique, the four polyesterurethanes were blended into homopolymeric polyvinyl chloride (GEON 102 EP F-5, B. F. Goodrich Co.) at a concentration of one part polyesterurethane per one part PVC. The four samples (100 parts PVC/100 parts polyesterurethane) were tested for failure of the polyesterurethane characterized by haze (bloom) and exudation (humidity) and for water extraction of the polyesterurethane. The results of the tests are set forth below:

|  | Polyesterurethane | | | |
|---|---|---|---|---|
|  | Ordered | Ordered-Random | Macro-random | Micro-random |
| Days to Humidity Fail | 5–14 | 5–14 | 5–14 | 1 |
| Shore A | 72 | 72 | 72 |  |
| $T_f$ °C. | −25 | −25 | −25 |  |
| Days to Bloom Fail | 120 | 105 | 65 | No data due to sample failure |
| % Loss to H$_2$O |  |  |  |  |
| 50° (24 hr) | 0.1 | 0.1 | 0.1 |  |
| 80° (24 hr) | 0.2 | 0.2 | 0.2 |  |

The superiority of the polyesterurethanes of the present invention is obvious from the above data. Polyesters of the present invention would be expected to exhibit similar superior characteristics.

Although polyvinyl chloride systems are illustrated in the Examples, similar results are obtained in other halogen-containing polymer systems, whether in the form of coatings, articles, foamed products, plastisols, organosols or the like.

The amount of plastifier added may be from about 1 to about 100 phr (parts per hundred parts resin).

Accordingly, the polymers which are plastified in accordance with this invention include vinyl halide polymers, i.e. simple, unmixed homopolymeric vinyl chloride or copolymers or terpolymers in which the polymeric structure of polyvinyl chloride is interspersed at intervals with the residues of other ethylenically unsaturated compounds which are interpolymerizable therewith. The essential properties of the polymeric structure of polyvinyl chloride are retained if not more than about 40 percent of a comonomer is interpolymerized therewith. Suitable comonomers include vinyl halides such as vinyl bromide or vinyl fluoride; vinyl esters such as vinyl acetate, vinyl chloroacetate, vinyl butyrate and fatty acid vinyl esters; vinyl alkyl sulfonates; trichloroethylene; vinyl ethers such as vinyl ethyl ether, vinyl isopropyl ether and vinyl chloroctyl ether; aromatic an cyclic unsaturated compounds such as styrene, the mono- and polychlorostyrenes, coumarone, indene, vinyl naphthalene, vinyl pyridine, vinyl pyrrole; acrylic acid and its derivatives such as ethyl acrylate, methyl methacrylate, ethyl methacrylate, ethyl chloroacrylate, acrylonitrile and methacrylonitrile; vinylidene compounds such as vinylidene chloride, vinylidene bromide; unsaturated hydrocarbons such as ethylene, propylene and isobutenes; allylic compounds such as allyl acetate, allyl chloride and allyl ethyl ether; conjugated and cross-conjugated ethylenically unsaturated compounds such as butadiene, isoprene, chloroprene, 2,3-dimethylbutadiene-1,3, piperylene, divinyl ketone and esters such as diethyl maleate and diethyl fumarate.

Specific interpolymers which may be flame retarded in accordance with the present invention include vinyl chloride/vinyl acetate, ethylene/vinyl chloride/vinyl acetate, ethylene/vinyl chloride/acrylonitrile and the like.

Similarly, other halogen-containing polymers contemplated herein include halogenated olefins, e.g., chlorinated polyethylene and chlorinated polypropylene; halogenated diolefins, e.g., chloroprene; chlorinated paraffins and chlorosulfonated polyolefins, e.g., chlorosulfonated polyethylene and the like as well as polyblends of such halogen-containing polymers with non-halogenated resins.

While the invention has been described by referring to certain specific embodiments, it is not so limited since many modifications are possible in the light of the above teachings. The invention may therefore be practiced otherwise than as specifically described without departing from the spirit and scope thereof.

What is claimed is:

1. An ordered-random, solid, block copolyesterurethane having from about 15 to about 50 percent by weight amorphous end blocks and from about 85 to about 50 percent by weight random copolymer center block having from about 20 to about 95 percent crystallinity based on heat of fusion, said copolyesterurethane having from about 25 to about 50 percent crystallinity based on heat of fusion, said random copolymer having randomly alternating amorphous and semi-crystalline prepolymer blocks coupled via ester or urethane linkages, said semi-crystalline prepolymer being prepared by reacting dicarboxylic acid with a mixture of non-crystallizing dihydroxy compound and crystallizing dihydroxy compound in a ratio of non-crystallizing dihydroxy compound to crystallizing dihydroxy compound from about 0.1 to about 0.5, and said end blocks and center block being isocyanate-coupled.

2. Copolyesterurethane of claim 1 having a crystallinity of about 25 percent.

3. Composition comprising a halogen-containing polymer and a copolyesterurethane of claim 1.

4. Composition of claim 3, said halogen-containing polymer being a vinyl chloride polymer.

5. Composition of claim 4, said end blocks being prepared by reacting aliphatic dicarboxylic acid having from about 4 to about 10 carbon atoms with dihydroxy compound selected from 1,3-butylene glycol, 1,2-propylene glycol, 1,3-propylene glycol, 2-ethyl-1,3-hexanediol, diethylene glycol and dipropylene glycol.

6. Composition of claim 5, said non-crystallizing dihydroxy compound being selected from 1,3-butylene glycol, 1,2-propylene glycol, 1,3-propylene glycol, 2-ethyl-1,3-hexanediol, diethylene glycol and dipropylene glycol, said crystallizing dihydroxy compound being selected from ethylene glycol, 1,4-butylene glycol, 1,6-hexanediol and neopentyl glycol, and said acid being aliphatic dicarboxylic acid having from about 4 to about 10 carbon atoms.

7. Composition of claim 6, said end blocks being prepared by reacting aliphatic dicarboxylic acid having from about 4 to about 10 carbon atoms with dihydroxy compound selected from 1,3-butylene glycol, 1,2-propylene glycol, 1,3-propylene glycol, 2-ethyl-1,3-hexanediol, diethylene glycol and dipropylene glycol.

8. Composition of claim 7 wherein said dicarboxylic acid is adipic acid, said non-crystallizing dihydroxy compound is 1,3-butylene glycol and said crystallizing dihydroxy compound is 1,4-butylene glycol.

9. Composition of claim 8, said copolyesterurethane having a molecular weight from about 80,000 to about 100,000 and said end blocks and center block being hexamethylene diisocyanate-coupled.

10. Copolyesterurethane of claim 1, said end blocks being prepared by reacting aliphatic dicarboxylic acid having from about 4 to about 10 carbon atoms with dihydroxy compound selected from 1,3-butylene glycol, 1,2-propylene glycol, 1,3-propylene glycol, 2-ethyl-1,3-hexanediol, diethylene glycol and dipropylene glycol.

11. Copolyesterurethane of claim 1, said non-crystallizing dihydroxy compound being selected from 1,3-butylene glycol, 1,2-propylene glycol, 1,3-propylene glycol, 2-ethyl-1,3-hexanediol, diethylene glycol and dipropylene glycol, said crystallizing dihydroxy compound being selected from ethylene glycol, 1,4-butylene glycol, 1,6-hexanediol and neopentyl glycol, and said acid being aliphatic dicarboxylic acid having from about 4 to about 10 carbon atoms.

12. Copolyesterurethane of claim 11, said end blocks being prepared by reacting aliphatic dicarboxylic acid having from about 4 to about 10 carbon atoms with dihydroxy compound selected from 1,3-butylene glycol, 1,2-propylene glycol, 1,3-propylene glycol, 2-ethyl-1,3-hexanediol, diethylene glycol and dipropylene glycol.

13. Copolyesterurethane of claim 12 wherein the acid used in preparation of said semi-crystalline prepolymer is adipic acid, said non-crystallizing dihydroxy compound is 1,3-butylene glycol and said crystallizing dihydroxy compound is 1,4-butylene glycol.

14. Copolyesterurethane of claim 13 having a molecular weight from about 80,000 to about 100,000.

15. Copolyesterurethane of claim 13, said end blocks and center block being hexamethylene diisocyanate-coupled.

* * * * *

UNITED STATES PATENT AND TRADEMARK OFFICE
CERTIFICATE OF CORRECTION

PATENT NO. : 4,212,957
DATED : July 15, 1980
INVENTOR(S) : John W. Hirzy

It is certified that error appears in the above-identified patent and that said Letters Patent are hereby corrected as shown below:

In column 2, between lines 46 and 59, the dots are missing from the copolymer representations, which should be corrected to read -- 
|     | End Block | Center Block | End Block |
|-----|-----------|--------------|-----------|
| (A) | X—X—X—X—X·······X—X—X—X—X | | |

ORDERED

|     | End Block | Center Block | End Block |
|-----|-----------|--------------|-----------|
| (B) | X—X—X··—X—··X···X·—X···—X—X—X | | |

ORDERED RANDOM (C)  X—X·—···—X—X—X·—··X·—·X·—·X—X·—·X

MACRORANDOM

--

Signed and Sealed this

*Eighteenth* Day of *November 1980*

[SEAL]

*Attest:*

*Attesting Officer*

SIDNEY A. DIAMOND

*Commissioner of Patents and Trademarks*